(12) United States Patent
Wettstein

(10) Patent No.: US 8,875,483 B2
(45) Date of Patent: Nov. 4, 2014

(54) GAS TURBINE GENERATOR SET

(75) Inventor: Hans Wettstein, Fislisbach (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/410,328

(22) Filed: Mar. 2, 2012

(65) Prior Publication Data
US 2012/0210723 A1    Aug. 23, 2012

Related U.S. Application Data

(63) Continuation of application No. PCT/EP2010/062026, filed on Aug. 18, 2010.

(30) Foreign Application Priority Data

Sep. 3, 2009 (CH) ........................................ 1369/09

(51) Int. Cl.
*F02C 7/08* (2006.01)
*F02G 1/00* (2006.01)
*F02G 3/00* (2006.01)

(52) U.S. Cl.
USPC ................ 60/39.52; 60/39.5; 60/805; 60/806

(58) Field of Classification Search
USPC ................................. 60/39.5, 39.52, 805, 806
See application file for complete search history.

(56) References Cited

U.S. PATENT DOCUMENTS

| | | | |
|---|---|---|---|
| 4,528,811 A * | 7/1985 | Stahl | ................................. 60/784 |
| 4,932,861 A | 6/1990 | Keller et al. | |
| 5,454,220 A | 10/1995 | Althaus et al. | |
| 5,588,826 A | 12/1996 | Dobbeling et al. | |
| 5,634,327 A * | 6/1997 | Kamber et al. | ................. 60/773 |
| 6,389,793 B1 | 5/2002 | Priestley | |
| 6,481,212 B2 * | 11/2002 | Priestley | ......................... 60/782 |
| 6,598,402 B2 | 7/2003 | Kataoka et al. | |
| 6,644,012 B2 * | 11/2003 | Hoffmann et al. | ......... 60/39.182 |
| 7,490,472 B2 * | 2/2009 | Lynghjem et al. | ............... 60/772 |
| 7,506,555 B2 * | 3/2009 | Brostmeyer et al. | ......... 73/865.6 |
| 7,926,256 B2 * | 4/2011 | Draper et al. | ................. 60/39.52 |
| 8,056,318 B2 * | 11/2011 | Chillar et al. | ................. 60/39.52 |
| 2002/0043063 A1 | 4/2002 | Kataoka et al. | |

(Continued)

FOREIGN PATENT DOCUMENTS

DE     3413241 A1     6/1985
EP     0022349 A1     1/1981

(Continued)

OTHER PUBLICATIONS

European Patent Office, International Search Report in International Patent Application No. PCT/EP2010/062026 (Aug. 18, 2010).

(Continued)

*Primary Examiner* — Craig Kim
(74) *Attorney, Agent, or Firm* — Buchanan Ingersoll & Rooney PC

(57) ABSTRACT

A gas turbine generator set includes a compressor unit including at least one compressor, at least one generator and at least one combustion chamber. Exhaust gases from at least one turbine are recirculated for a further thermal utilization. At least one cooling fluid compressor is configured to compress a cooling fluid including at least one of fresh air and a portion of the recirculated exhaust gases for a cooling of thermally loaded parts.

37 Claims, 6 Drawing Sheets

(56) References Cited

U.S. PATENT DOCUMENTS

| | | |
|---|---|---|
| 2003/0051481 A1* | 3/2003 | Priestley .................... 60/782 |
| 2003/0084656 A1 | 5/2003 | Hoffmann et al. |
| 2006/0127590 A1 | 6/2006 | Dietz et al. |
| 2007/0034171 A1* | 2/2007 | Griffin et al. ............. 122/479.1 |
| 2008/0104958 A1 | 5/2008 | Finkenrath et al. |
| 2009/0284013 A1* | 11/2009 | Anand et al. .................... 290/52 |

FOREIGN PATENT DOCUMENTS

| | | |
|---|---|---|
| EP | 0321809 A1 | 6/1989 |
| EP | 0516995 A1 | 12/1992 |
| EP | 0620362 A1 | 10/1994 |
| EP | 0620363 A1 | 10/1994 |
| EP | 0704657 A1 | 4/1996 |
| JP | 2007170307 A | 7/2007 |
| WO | WO 9851917 A1 | 11/1998 |
| WO | WO 03038244 A1 | 5/2003 |
| WO | WO 2004042113 A1 | 5/2004 |

OTHER PUBLICATIONS

European Patent Office, Search Report in Swiss Patent Application No. 01369/09 (Feb. 3, 2010).

* cited by examiner

GAS TURBINE GENERATOR SET

CROSS-REFERENCE TO PRIOR APPLICATIONS

This application is a continuation of International Patent Application No. PCT/EP2010/062026, filed on Aug. 18, 2010, which claims priority to Swiss Patent Application No. CH 01369/09, filed on Sep. 3, 2009. The entire disclosure of both applications is incorporated by reference herein.

FIELD

The present invention refers to a gas turbine generator set and a method for operating a gas turbine generator set.

BACKGROUND

In relation to $CO_2$ separation when operating fossil-fired power plants, various exhaust gas recirculation systems exist. The purpose of such systems is to be seen in each case as that of simplifying the separation of pollutants, such as $CO_2$ and NOx, in the exhaust gas which is to be discharged to the atmosphere by an increased pollutant concentration allowing the treatment of smaller exhaust gas mass flows. With these systems, as are described in US2008104958A1 or U.S. Pat. No. 6,598,402 B2, for example, a portion of the exhaust gas is mixed with fresh air, cooled and inducted again by the compressor, compressed, and fed again to the combustion chamber as oxygeneous gas. The limit with regard to the potential recirculation rate is achieved when the oxygen proportion in the gas turbine combustion chamber has reached a permissible minimum.

All modern gas turbines, however, now have a cooling fluid supply taking place at different pressure- and temperature levels for cooling the thermally loaded parts of this very gas turbine. The cooling fluid supply is maintained according to the prior art by extraction of compressed air from the compressor. This air, therefore, bypasses the combustion chamber. In this way, a significant proportion of the fresh air which is inducted on the compressor side is taken away from the combustion in the combustion chamber. This leads to a reduction of the possible recirculation rate. Such an initial situation can also be established in the case of a sequentially fired gas turbine generator set, as is described in EP 0 620 362 B1, for example, the disclosure of which is incorporated by reference herein, in which proportions of the air which is inducted on the compressor side has to be taken away from the combustion of the high-pressure combustion chamber and the low-pressure combustion chamber.

A further disadvantage of previous cooling fluid supply systems is that its pressure has to be designed for the most unfavorable case in order to ensure an adequate cooling fluid supply in all operating states. Gas turbines with such cooling fluid systems, however, often run in modes of operation in which a lower cooling fluid pressure would be quite sufficient. This compromises the efficiency.

A further disadvantage of previous cooling fluid supply systems is that the total air which is inducted by the compressor has to be filtered in a quality (freedom of dust, etc.) as is required by the cooling systems with their fine passages of less than one millimeter in diameter. The largest portion of the air, however, would not at all require this filtering quality and the pressure loss inherently associated therewith.

SUMMARY OF THE INVENTION

In an embodiment, the present invention provides a gas turbine generator set. The generator set includes a compressor unit including at least one compressor, at least one generator and at least one combustion chamber. Exhaust gases from at least one turbine are recirculated for a further thermal utilization. At least one cooling fluid compressor is configured to compress a cooling fluid including at least one of fresh air and a portion of the recirculated exhaust gases for a cooling of thermally loaded parts.

BRIEF DESCRIPTION OF THE DRAWING

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
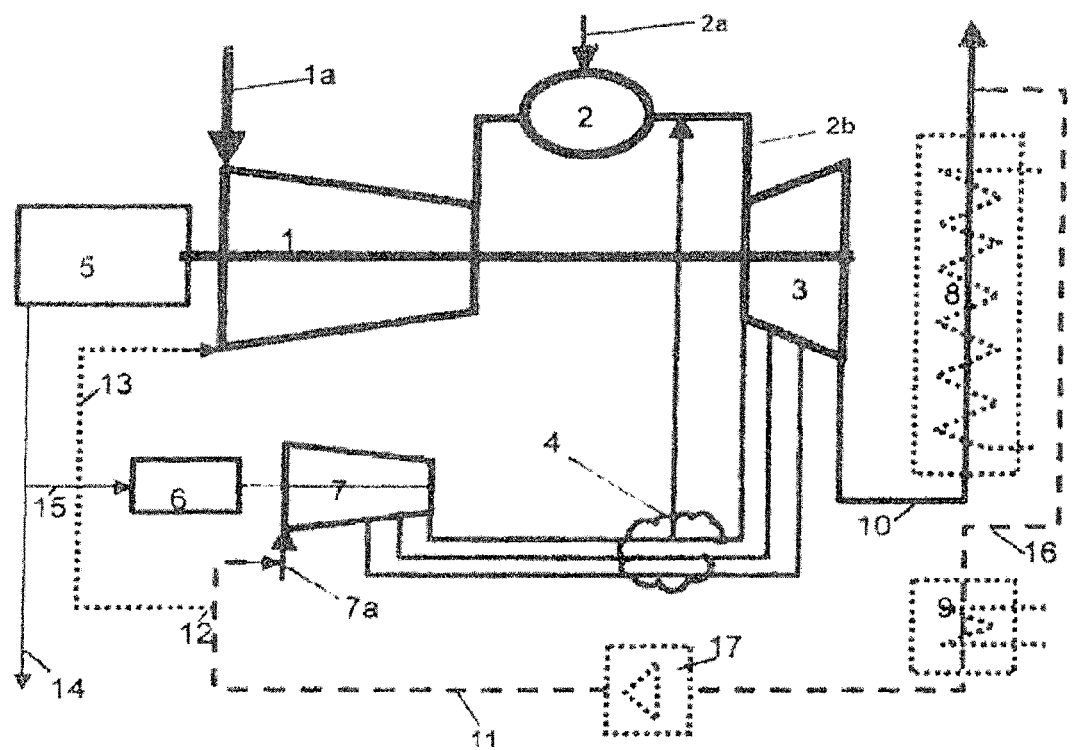
FIG. 1 shows an embodiment of a circuit of a gas turbine generator set with a separate cooling fluid compressor with optional HRSG and optional exhaust-gas recirculation.
Figure 2:
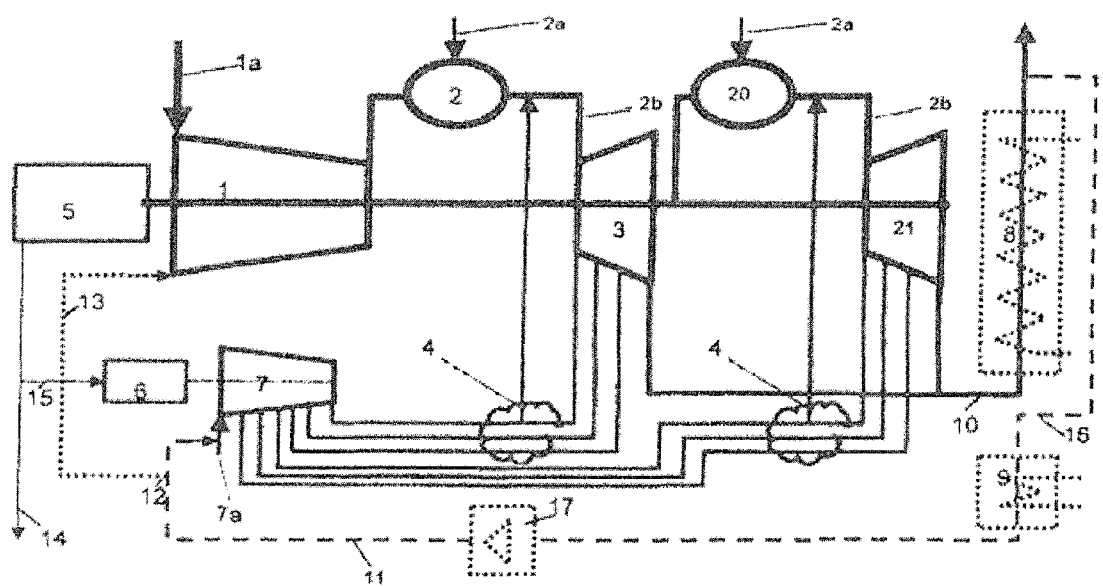
FIG. 2 shows an embodiment of a circuit of a gas turbine generator set with filters.
Figure 3:
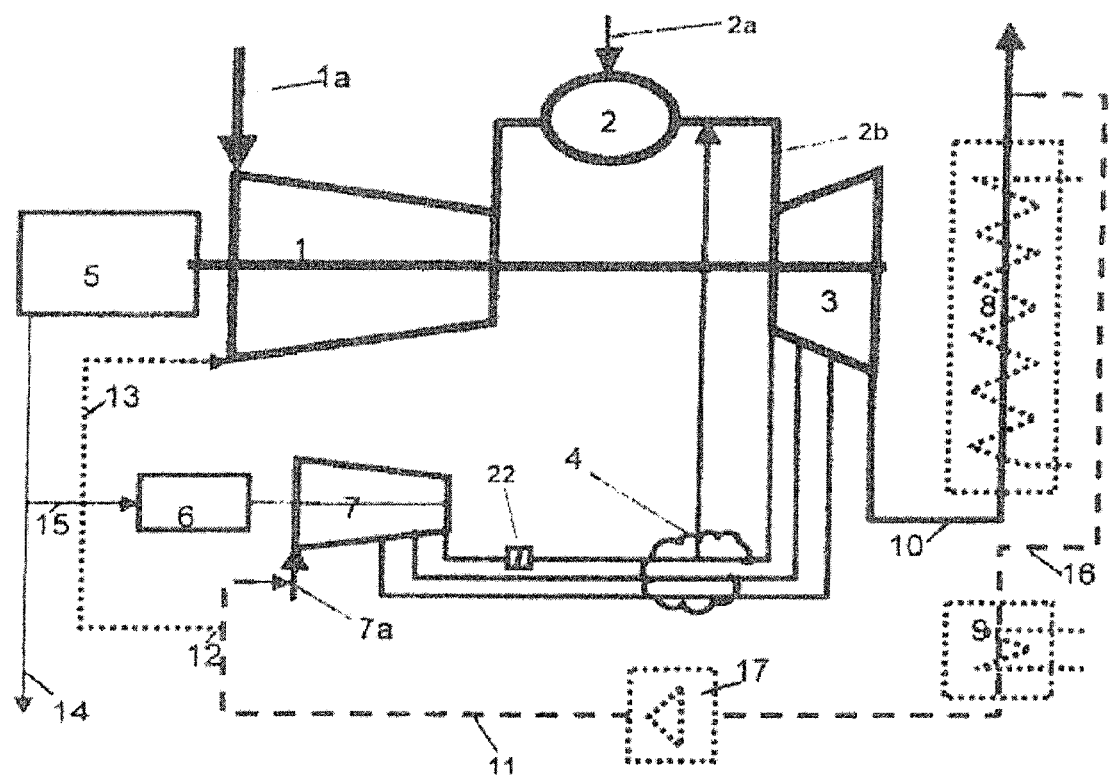
FIG. 3 shows an embodiment of a circuit of a gas turbine generator set with a second combustion chamber and a second turbine.
Figure 4:
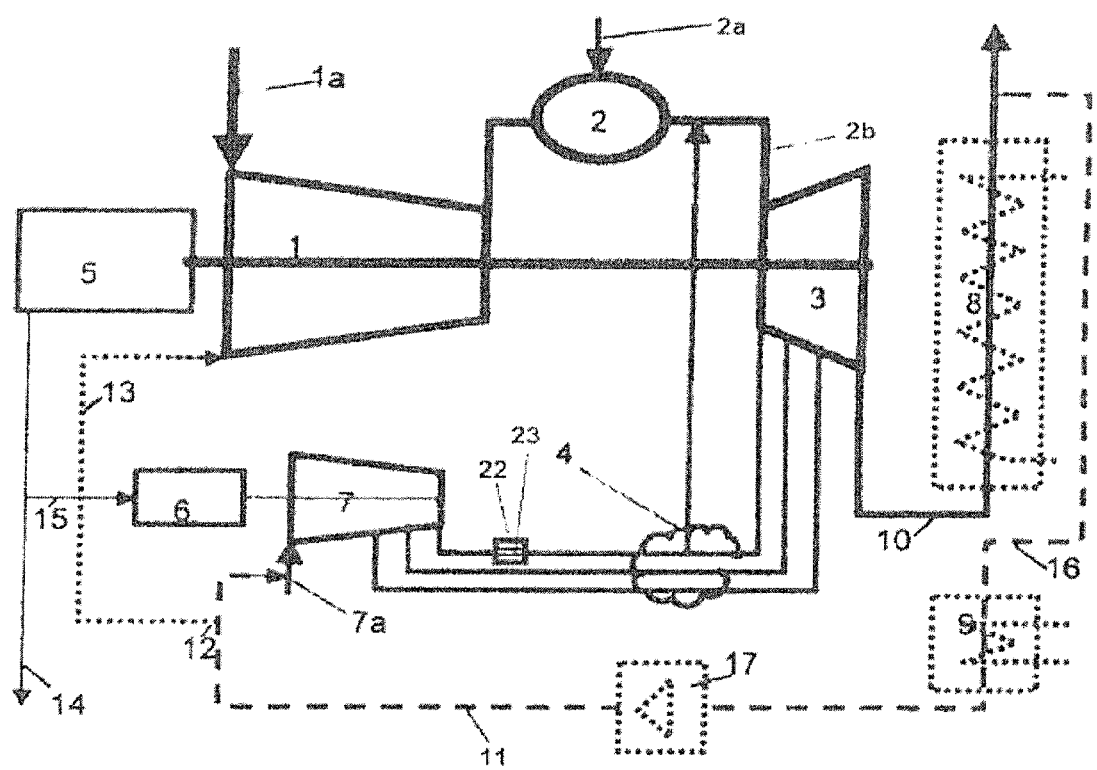
FIG. 4 shows an embodiment of a circuit of a gas turbine generator set with a shut-off element including a check valve.
Figure 5:
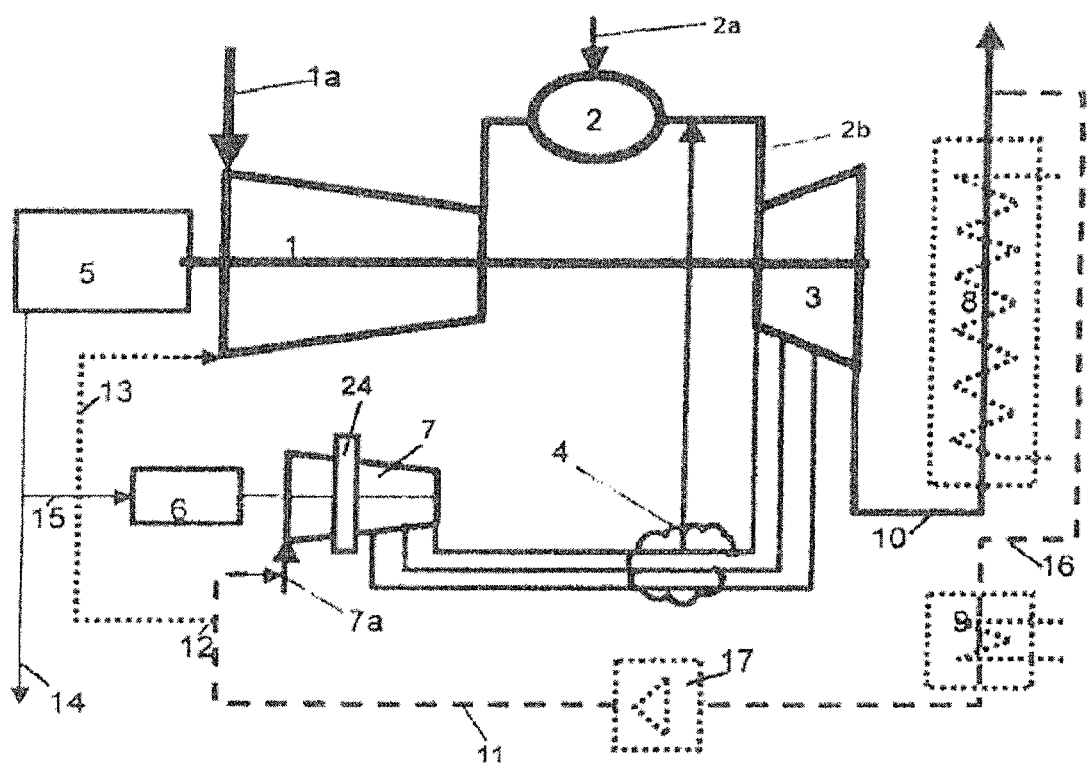
FIG. 5 shows an embodiment of a circuit of a gas turbine generator set with an intercooler.
Figure 6:
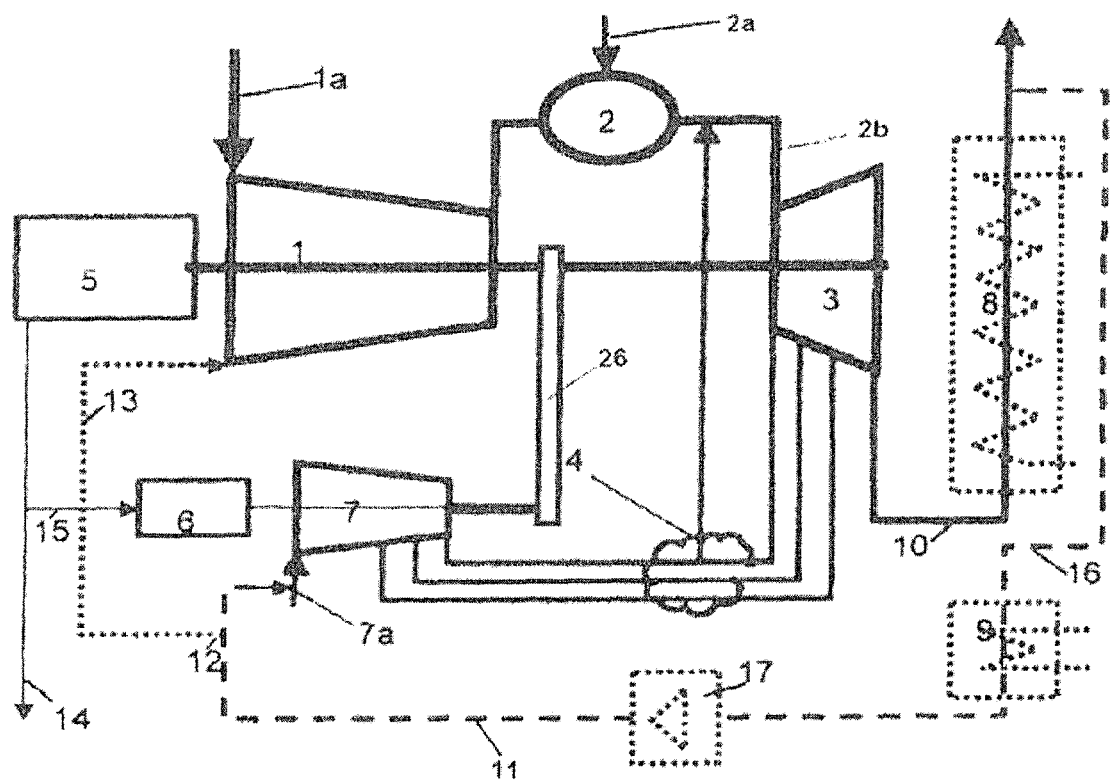
FIG. 6 shows an embodiment of a circuit of a gas turbine generator set with a gear shaft connecting the turbine and the cooling fluid compressor.

In an embodiment, the present invention eliminates the aforesaid disadvantages in a gas turbine generator set of the type referred to in the introduction, and ensures that the potential recirculation rate can be maximized and at the same time ensuring that the pressure of the cooling fluid supply can be adapted to the current operating state of the gas turbine.

In an embodiment, the invention provides for thermally loaded parts of the gas turbine generator set being cooled by means of cooling fluids, for example by means of cooling air, which originate partially or totally from a separate compressor—also referred to in the following text as a cooling fluid compressor—by these cooling fluids being provided in sufficient quantity and at the required pressure. The fluid entering the cooling fluid compressor, as a result of the separate routing, can be filtered to a higher quality than the greater part of the process fluid which is inducted into the main compressor. This enables savings in filtering and/or enables higher cooling fluid cleanliness, as a result of which even smaller cooling passages in the cooling systems become possible.

According to an embodiment of the invention, the cooling fluid compressor inducts air which as an option is specially filtered and perhaps mixed with cooled and possibly treated exhaust gases. If a partial recirculation mode is operated, the cooling fluid compressor can induct up to 100% of exhaust gases, wherein the combustion chamber of the main machine continues to be operated with 100% of air and therefore no modification is required in comparison to the operation without recirculation. If the recirculation rate is to be further increased, more gas can optionally be added to the inducted air of the main compressor, which is part of the gas turbine generator set, until the minimum permissible oxygen content in the combustion chamber is achieved. The limit value of the potential recirculation rate can be significantly increased as a result.

In the case of gas turbine generator sets with one or two combustion chambers (see, for example, EP 0 620 362 B1), splitting of the cooling fluid supply between main compressor and cooling fluid compressor can readily be carried out or undertaken so that operation with partial load could be maintained in the case of damage to the cooling fluid compressor, for example.

A further advantage of an embodiment of the invention is to be seen in the fact that different optimizing possibilities or options exist for startup of the gas turbine generator set with a separate cooling fluid compressor for providing the necessary starting power. In this respect, the cooling fluid compressor can be started a little later and can initially be operated with reduced power. Its full power becomes necessary only during nominal load operation so that higher partial-load efficiency can also be achieved therefrom.

In an embodiment, the cooling fluid compressor can also be equipped with tappings at different pressure stages in order to operate the different pressure stages of the cooling systems. An even more flexible arrangement would be the use of optionally controllable compressors, which can be operated in parallel, for the supply of the different pressure stages with the appropriate cooling fluid state in each case.

A further, also significant, advantage of an embodiment of the invention involves the provision of cooling fluids which have to meet the very high demands for cleanliness and freedom from dust. Bearing in mind that the cooling fluid has to flow through extremely fine passages—the blockage of which can cause considerable damage—this can be managed with the conventional provision of cooling fluids by the total inducted air being correspondingly filtered. For this purpose, use has to be made of large air filters which create pressure losses which lead to a loss of efficiency. With a separate cooling fluid compressor, or with a plurality of cooling fluid compressors, their fresh air supply, and possibly the recirculation gas, can be purposefully filtered better than the fluid entering the main compressor. Solely by the reduction of the filter pressure loss upstream of the main compressor, the overall efficiency of a typical gas turbine can be improved by about 0.1 percent.

A further advantage of an embodiment of the invention is to be seen in the fact that in combined cycles the waste heat of various intermediate cooling processes of the cooling fluid compressor can easily be connected into the steam process, which also again brings along an improvement of the efficiency.

A further advantage of an embodiment of the invention is to be seen in the fact that each cooling line—branching from the cooling fluid compressor—to the combustion chambers or turbines can be supplemented with measures which ensure that in the case of a failure of the cooling fluid compressor a redundant cooling fluid supply is automatically effected, for example even by the use of steam. If the feed of cooling fluid takes place by means of the main compressor, this is less easily possible.

Providing a redundant minimum cooling fluid supply outside the regular cooling provisions is ensured, the accustomed operation of the gas turbine generator set according to the invention, especially of the sequentially-fired gas turbine generator set, can be further maintained even in the case of a cooling fluid pressure drop.

With regard to driving the cooling fluid compressor, it is thus important that this is carried out independently of the network, which is either by means of direct coupling to the gas turbine shaft or by means of an electric motor which is connected to the internal supply—independent of the network—of the gas turbine power plant. The latter has the additional advantage that the cooling fluid compressor, or the cooling fluid compressors, can be operated via a frequency converter with variable rotational speed. In this way, the output volume and pressure of the cooling fluid can be controlled. Alternatively or in addition, the cooling fluid compressor, or the cooling fluid compressors, can also be equipped with rows of variable intake guide vanes. This allows controlling of the output volume and pressure even at constant rotational speed.

If an existing gas turbine generator set is to be extended for operation with a separate cooling fluid compressor, then, for example, the swallowing capability of the combustion chamber, or of the combustion chambers, and of the turbine blading arrangements is to be correspondingly increased because the cooling fluid, previously extracted from the main compressor, then flows through the main passage. In this case, the overall power output of the plant increases in proportion to the inducted air volume by 10-30%. By the same token, the adjustment could also be carried out by corresponding reduction of the air volumes in the main compressor upstream of the cooling fluid tappings which are no longer required. In the latter case, no significant change to power output would ensue.

In an embodiment of a gas turbine generator set with sequential firing, provided by the applicant, improvements ensue with regard to:
  overall power output.
  efficiency of the main machine as a result of the reduced relative clearances.
  efficiency of the cooling fluid compressor as a result of the reduction—being adjustable to the operating state—of the pressure ratio and as a result of an intercooler, or a plurality of intercoolers, the waste heat of which, moreover, can be utilized in the bottoming cycle.
  partial-load efficiency of the overall plant as a result of the optimizable cooling.
  the optionally implementable high-fogging operation which can be extended to a larger water injection volume since the cooling fluid compressor can be adjusted at any time for a pressure increase.
  the possibility of saving cooling fluid by designing the cooling systems with fine passages, which only becomes possible as a result of the better filtering of the cooling fluid.
  service life of the cooled parts in the hot gas path. Owing to the adjustability of the pressure and the volume of the cooling fluid, the metal temperature of the hot gas parts can be kept almost constant during load changes between partial load states and/or full load states. As a result, temperature cycles are avoided and the LCF service life of these parts is increased.

Resulting from the above is the advantage that in a combined cycle plant, which according to an embodiment of the invention is operationally connected to such a gas turbine generator set and to a cooling fluid compressor, an absolute peak position is occupied both with regard to the power output and the efficiency in the nominal load range and partial load range.

The cooling fluid supply of a gas turbine generator set must not impair its availability. In an arrangement according to the invention, it is therefore advised to design the cooling fluid compressor particularly robustly, that is to say with lower gas bending stresses of the blades than the main compressor. Such designs can be seen in the case of relatively large blade chords and relatively small blade numbers per blade ring.

A development according to the invention during operation with the highest possible recirculation rate, in which little residual oxygen is present in the exhaust gas, can lead to corrosion problems of the hot parts which are affected by it. Against this, it is proposed to carry out a preoxidation of these parts in the production process and/or reconditioning process, especially in the case of parts which are exposed to a specific loading as a result of oxygen-deprived hot gas, such as in the case of turbine blades, heat accumulation segments, combustion chamber liners, burner parts, sensors, etc. In addition, operating cycles with fresh air (i.e. without exhaust gas recirculation) can also be engaged periodically or when required, as a result of which the oxide layers in the hot gas path are regenerated.

Additionally proposed is an operational situation which has proved to be advantageous. For the recirculation proportion, which is supplied to the main compressor, it is expedient to provide the admixture through an external opening, for example through an annular gap, upstream of the compressor blading. The final aim of this provision is to be seen as that of the possibly still existing bleeds for the cooling fluid lying towards the outside, and therefore being able to extract a higher proportion of recirculation gas than the core flow alone could bring about.

The solution according to the invention focuses, moreover, on the operational sequences during an emergency shutdown of the gas turbine generator set, bearing mind that in respect to the circuit we are still operating with a cooling fluid compressor here which has to be necessarily incorporated. For this purpose, it is proposed that the rotational speed and/or the rows of variable inlet guide vanes of the cooling fluid compressor is, or are, to be controlled in parallel to the operating data (e.g. turbine inlet temperature, compressor pressure, etc.) of the gas turbine generator set so that unnecessary thermal expansions and cyclic loads in the hot parts are avoided.

The proposed gas turbine operation with a separate cooling fluid compressor can be operated particularly well with "high fogging". In this case, the more water is injected, the slower the pressure build-up in the axial compressors of the gas turbine generator becomes. As a result, the pressure in the cooling fluid tappings lying in between can drop sharply. Existing solutions manage today by limiting the injectable volume of water to about 1% at most of the inducted air. The advantage of the circuit according to an embodiment of the invention is to be seen in the fact that the separate cooling fluid compressor, by means of a corresponding control, can satisfactorily compensate for the pressure differences previously caused by the "high fogging" operation. Accordingly, the circuit according to an embodiment of the invention is very well suited for enabling a "high fogging" operation even with higher water injection volumes, which leads to higher peak power outputs of the gas turbine generator set. A further possibility is to just operate the cooling fluid compressor with "high fogging" when required.

FIG. 1 shows a gas turbine generator set which is operated with a single combustion chamber 2. The gas turbine generator set can also be operated according to the sequential combustion principle, as is gathered from EP 0 620 363 B1, the disclosure of which is incorporated by reference herein. The provision—upstream of the combustion chamber—of the fuel 2a which is required for operating the combustion chamber, or the combustion chambers, and also for operating complementary heat generators, can be provided by means of a coal gasification facility, for example, which interacts with the gas turbine generator set. Naturally, it is also possible to obtain the fuel quantity to be used from a primary network (natural gas, for example). If the supply of a gaseous fuel is provided via a pipeline, then the potential from the pressure difference and/or temperature difference between the primary network and the consumer network can be recuperated for the interests of the gas turbine generator set, or for its circuit in general.

The present gas turbine generator set, which is extended by a heat recovery steam generator (HRSG) 8 and a recooler/condenser 9, can be readily extended by a downstream steam circuit to form a so-called combined cycle plant.

The gas turbine generator set, as an autonomous unit, basically consists of a main compressor 1, a combustion chamber 2 connected downstream to the main compressor 1, a turbine 3 connected downstream to this combustion chamber 2, and a generator 5. Said turbomachines 1, 3 preferably have a common rotor shaft. This rotor shaft is preferably supported on two bearings which are arranged on the head side of the compressor 1 and downstream of the turbine 3. The compressor 1 can then be provided with an intercooler.

The inducted air 1a, after its compression, flows towards the combustion chamber 2. The compressed air for the combustion chamber 2 can also be provided from a compressed air storage plant.

The combustion chamber 2 can be designed as an annular combustion chamber, and it has a number of burners—distributed upon the circumference on the head side—which bring about the hot gas generation.

A marked reduction or minimizing of the pollutant emissions from this combustion, especially with regard to the NOx emissions, can be achieved by premix burners being used, as described in EP-0 321 809 A1 or EP 0 704 657 A1, for example, the disclosure of each of which is incorporated by reference herein.

The hot gases 2b from the combustion chamber 2, as already explained above, impinge upon the turbine 3 which is connected directly downstream. If a gas turbine generator set with sequential combustion is used, then only some of the overpressure is relieved inside the first turbine. The final expansion is undertaken in this case in the second turbine after the partially expanded hot gases from the first turbine have been subjected to a renewed calorific processing in a second combustion chamber. For further embodiments in this context, reference is made to printed publication EP 0 620 363 B1.

With regard to FIG. 1 of this application, it is emphasized—particularly in relation to a $CO_2$ separation process—that various exhaust-gas recirculation systems are proposed according to the prior art in the case of gas turbine generator sets. Instead of many printed publications, reference is made to printed publications US 2008104958 A1 and U.S. Pat. No. 6,598,402 B1.

This can be explained here in more detail:

The purpose of such systems is to be seen as that of sustainably improving the separation of pollutants, especially $CO_2$ and NOx, in the exhaust gases which are to be discharged to the atmosphere by enabling the corresponding treatment of smaller exhaust gas mass flows on account of an increased pollutant concentration. With these systems, a portion of the exhaust gas is mixed with fresh air and inducted again by the compressor, compressed, and fed again to the combustion chamber as oxygeneous gas. The limit in the case of such a recirculation rate is reached if the oxygen content in the combustion chamber of the gas turbine generator set has achieved a permissible minimum.

However, all modern gas turbine generator sets now have cooling fluid supplies which at different pressure levels and temperature levels undertake the cooling of the thermally stressed parts. For this purpose, compressed air is extracted from the compressor, as a result of which these proportions bypass the combustion chamber. As a result, however, a significant proportion of the inducted air oxygen bypasses the combustion chamber and this proportion is consequently taken away from the combustion. As a result, it cannot be avoided that a reduction of the potential recirculation rate is the consequence.

With regard to this, FIG. 1 now shows which provisions according to an embodiment of the invention are made here. The cooling fluids for the cooling of the thermally stressed parts of a gas turbine generator set are partially or totally produced in a separate compressor 7, subsequently referred to as a cooling fluid compressor, which has separate fresh air induction 7a so that these cooling fluids are processed to the required pressures.

If the recirculation mode is operated, exhaust gas 11 (16) is added to the induction of the cooling fluid compressor, wherein up to 100% exhaust gas can be inducted. If still more exhaust gas is to be recirculated, the additional proportion of the exhaust gas 13 can be added to the inducted air 1a of the main compressor 1 until the minimum required oxygen concentration in the combustion chamber 2 is reached. In this state, the recirculation rate is significantly higher than is possible according to the prior art.

The cooling fluid compressor 7 is driven by the gas turbine directly via a gearbox or indirectly via a generator 5 and, as an option, by means of an electric motor 6 via an electrical frequency converter. It is advantageous if the cooling fluid compressor 7 can be properly controlled, be it by rotational speed variation and/or by rows of variable inlet guide vanes. As a result of such controlling, the partial load efficiency of the plant can be improved by no more volume and pressure than necessary having to be produced for the cooling systems 4, this being in contrast to a conventional gas turbine generator set in which the cooling fluid supply is predetermined strictly by the main compressor and consequently is dependent upon this. The cooling fluid compressor 7 can also be intercooled, as a result of which its parasitic power is reduced. As a result, the system efficiency is further improved. Moreover, cooling fluid is provided at a lower temperature, which possibly also enables a reduction of the cooling fluid mass flow.

This separation of the cooling fluid compression can also be used even in a sequentially fired gas turbine generator set (see above), that is to say regardless of whether the gas turbine generator set is operated with one combustion chamber or with two combustion chambers, whether the main compressor is intercooled or not, or whether it involves a single-shaft or multi-shaft installation.

A particularly advantageous circuit is created in conjunction with a partial exhaust gas recirculation which can be engaged as the case arises. In this case, the exhaust gas 10 from the turbine 3 is first cooled in a boiler 8 and one portion of it is then introduced into a recirculation branch 16. The other portion of the original exhaust gas 10 is blown off or fed to a $CO_2$ separation plant and/or to a NOx reduction plant. The recirculated exhaust gas flow 16 is further cooled in an intermediately provided recooler/condenser 9 before this gas flow is directed into the cooling fluid compressor 7, or is mixed with the inducted air 7a there. If a still higher recirculation rate is to be achieved, then at least a portion of the recirculated exhaust gas flow 16 is branched off upstream of the cooling fluid compressor 7 and, via a line 13, is added to the inducted fresh air 1a of the main compressor 1. The boiler 8 can simply be designed as an HRSG/steam boiler for producing a quantity of steam for the operation of a steam turbine connected downstream. If the cooling fluid compressor 7 is electrically driven, then it is important that this is carried out independently of the network, i.e. that the motor 6 is connected to an internal network which is fed by the generator 5 of the gas turbine generator set, wherein the external network connection 14 is effected outside of this link 15.

In addition to the main compressor 1, the cooling fluid compressor 7 can also be operated with "high fogging". During a "high fogging" operation of an axial compressor, the more water is injected, the slower the pressure build-up generally becomes. Since the pressure in the cooling fluid tappings lying in between can then become too low, a remedy for this is created by the injectable volume of water being limited to about 1% at most of the quantity of inducted air. The invention intervenes here by a controlling compensation taking place by means of the separate cooling fluid compressor 7, as a result of which the high fogging operation can be carried out with greater volumes of injected water, which then leads to higher peak load outputs.

In the recirculation line 13, provision is expediently made for a shut-off element, which is provided with a throttling function. As a result, the oxygen content in the combustion chamber 2 can be controlled. With a flap fully closed, the combustion chamber obtains pure fresh air. Intermediate throttling positioning can therefore be undertaken as the case arises, which makes the principle of operation of the combustion chamber and of the further circuit exceptionally flexible. The recirculation can also be controlled by a fan 17. If the gas turbine generator set is operated with recirculation only in the cooling fluid compressor, this case can be dispensed with because the cooling fluid compressor can apply its output pressure.

The recooler/condenser 9 can also be operated when required so that the temperature of the recirculation gas 16 can be lowered below ambient air temperature. In this way, the input power of the cooling fluid compressor 7 is reduced. In principle, this cooling fluid compressor 7 in its turn can have an intercooler, or a plurality of intercoolers, which further reduce its input power.

From FIG. 1, the bottoming cycle is represented here only by the HRSG/steam boiler 8. It is obvious that to this end the remaining parts and units of a combined cycle can be associated with this.

Flue gas recirculation (FRG) and $CO_2$ separation can also be introduced by the total recirculated gas going through the cooling fluid compressor 7. As a result, corresponding adjustments to the combustion chamber 2 are no longer necessary. In such a case, the plant can be commercialized as so-called "capture ready". If, however, the aim is a higher degree of recirculation, a portion of the cooled exhaust gas 11, via a branch 12 located upstream of the cooling fluid compressor 7 and additionally via a line 13, can be fed to the main compressor 1 and mixed with the inducted fresh air 1a there. If now the combustion technology in the combustion chamber 2 is subjected to a modification, a higher degree of recirculation can be achieved with the separate cooling fluid compressor 7 than with the previous solutions since an oxygen bypass is dispensed with as a result of the cooling systems 4 for cooling the thermally loaded parts of the gas turbine generator set.

In a further extreme case, the mass flow proportion of the cooling fluid compressor can be increased to the extent that the combustion chamber is operated near-stoichiometrically. The fluid which is possibly not required for cooling in this case can be added between the combustion chamber and the turbine. This solution, especially in the case of fuels with low calorific value (e.g. so-called LBTU gas or MBTU gas), can have the advantage that the maximum exhaust gas recirculation is carried out only in the cooling fluid compressor, and that therefore no influencing at all of the combustion takes place.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

1 Compressor (main compressor)
1a Inducted air
2 Combustion chamber
2a Fuel
2b Hot gases
3 Turbine
4 Lines supplying the cooling systems
5 Generator
6 Electric motor
7 Cooling fluid compressor
7a Fresh air induction
8 Optional Heat Recovery Steam Generator (HRSG)
9 Optional recooler/condenser
10 Exhaust gas from the turbine 7
11 Cooled exhaust gas
12 Branch
13 Exhaust gas, recirculation line
14 External network connection
15 Power supply
16 Optional recirculation branch, recirculated exhaust gas flow
17 Optional fan in the recirculation path
18 Cooling fluid filter
19 Compressor unit filter
20 $2^{nd}$ combustion chamber
21 $2^{nd}$ turbine
22 Shut-off element
23 Check valve
24 Intercooler
25 Shaft
26 Gearbox

What is claimed is:

1. A gas turbine generator set, comprising:
a compressor unit including a compressor;
a generator;
a combustion chamber;
a turbine, configured such that an exhaust gas from the turbine is recirculated for a further thermal utilization;
a cooling fluid compressor:
a cooling fluid filter; and
a compressor unit filter,
wherein the cooling fluid filter is finer than the compressor unit filter,
wherein the cooling fluid compressor is configured to be supplied with a cooling fluid including (i) fresh air and (ii) a portion of the exhaust gas from the turbine, and configured such that the cooling fluid, compressed in the cooling fluid compressor, cools a thermally loaded part of the turbine.

2. The gas turbine generator set as recited in claim 1, wherein the cooling fluid compressor is configured to control a mass flow.

3. The gas turbine generator set as recited in claim 2, wherein the mass flow is controlled by
an adjustable rotation speed,
at least one row of variable inlet guide vanes, or
an adjustable rotation speed and at least one row of variable inlet guide vanes.

4. The gas turbine generator set as recited in claim 1, wherein the fluid entering the compressor unit is not filtered.

5. The gas turbine generator set as recited in claim 1, wherein the compressor unit filter causes a pressure drop of less than 8 millibars.

6. The gas turbine generator set as recited in claim 1, further comprising:
a cooling system including passages or film cooling holes, each having a clear width less than 0.6 mm.

7. The gas turbine generator set as recited in claim 1, further comprising:
a second combustion chamber; and
a second turbine,
wherein the combustion chamber is a first combustion chamber,
wherein the turbine is a first turbine,
wherein the first combustion chamber is disposed downstream of the compressor unit,
wherein the first turbine is disposed downstream of the first combustion chamber,
wherein the second combustion chamber is disposed downstream of the first turbine,
wherein the second turbine is disposed downstream of the second combustion chamber, and
wherein the first and the second turbines are thermodynamically interconnected.

8. The gas turbine generator set as recited in claim 1, further comprising;
a heat recovery steam generator configured to receive the exhaust gas.

9. The gas turbine generator set as recited in claim 8, configured such that the exhaust gas is extracted on a discharge side of the heat recovery steam generator.

10. The gas turbine generator set as recited in claim 9, further comprising:
a recooler/condenser,
wherein the recooler/condenser is disposed upstream of the compressor unit and configured to receive the exhaust gas.

11. The gas turbine generator set as recited in claim 1, further comprising:
a recirculation line for the exhaust gas, and
a fan disposed in the recirculation line.

12. The gas turbine generator set as recited in claim 11, wherein the fan is configured to control a recirculation rate of the exhaust gas.

13. The gas turbine generator set as recited in claim 1, further comprising:
a cooling fluid line branching from the cooling fluid compressor to the thermally loaded part to be cooled.

14. The gas turbine generator set as recited in claim 13, wherein the cooling fluid line includes a shut-off element.

15. The gas turbine generator set as recited in claim 14, wherein the shut-off element includes a check valve.

16. The gas turbine generator set as recited in claim 1, further comprising:

a plurality of cooling fluid lines branching from the cooling fluid compressor to the thermally loaded part to be cooled.

17. The gas turbine generator set as recited in claim 16, wherein each of the plurality of cooling fluid lines is at a different pressure.

18. The gas turbine generator set as recited in claim 1, wherein the cooling fluid compressor includes a intercooler.

19. The gas turbine generator set as recited in claim 18, wherein a mass flow of the cooling fluid compressor is configured to be reduced in proportion to a reduced discharge temperature of the cooling fluid compressor.

20. The gas turbine generator set as recited In claim 1, wherein the cooling fluid compressor is configured to be driven by a shaft of the gas turbine generator set directly.

21. The gas turbine generator set as recited in claim 1, further comprising:
an electric motor, configured to drive the cooling fluid compressor, and operationally connected to the generator so as to provide a power supply in an event of failure of an external network connection.

22. The gas turbine generator set as recited in claim 10, wherein a portion of the recirculated exhaust gas is branched downstream of the recooler/condenser and upstream of the cooling fluid compressor.

23. The gas turbine generator set as recited in claim 1, wherein the cooling fluid compressor includes a plurality of cooling fluid compressors configured to be operated sequentially or in parallel.

24. The gas turbine generator set as recited in claim 7, wherein the second combustion chamber includes a self-igniting combustion chamber.

25. The gas turbine generator set as recited in claim 7, wherein the first and the second turbines are disposed on a common rotor shaft.

26. The gas turbine generator set as recited in claim 1, wherein the compressor unit and the cooling fluid compressor are configured to be operated in a high fogging mode, in which an inducted air comprises water.

27. The gas turbine generator set as recited in claim 26, wherein the high fogging mode includes operating the compressor unit and the cooling fluid compressor with at least 0.5% water quantity of an inducted air volume.

28. The gas turbine generator set as recited in claim 1, wherein the cooling fluid compressor is configured to be driven by a shaft of the gas turbine generator set via a gearbox.

29. A method for operating a gas turbine generator set including a compressor unit comprising a compressor, a generator, a combustion chamber, a turbine, a cooling fluid compressor, a cooling fluid filter, and a compressor unit filter, the method comprising:
filtering inducted air fed into the compressor unit with the compressor unit filter;
recirculating an exhaust gas from the turbine for a further thermal utilization, the recirculating including:
supplying the cooling fluid compressor, through the cooling unit filter, with a cooling fluid including fresh air and a portion of the exhaust gas;
compressing the cooling fluid in the cooling fluid compressor, to obtain a compressed cooling fluid; and
supplying the compressed cooling fluid to a thermally loaded part, to cool the thermally loaded part with the supplied compressed cooling fluid,
wherein the thermally loaded part exposed to hot gases downstream of the combustion chamber is preoxidized, and
wherein the cooling fluid filter is finer than the compressor unit filter.

30. The method as recited in claim 29, wherein the recirculating further includes periodically interrupting the recirculating by phasing fresh air into the gas turbine generator set so as to regenerate an oxide layer of the thermally loaded part.

31. The method as recited in claim 29, wherein a portion of the cooling fluid includes fluid from the main compressor, and
wherein the gas turbine generator set is operable at a partial load in an event of a failure of the cooling fluid compressor.

32. The method as recited in claim 29, further comprising:
connecting waste heat of an intercooler of the cooling fluid compressor into a bottoming cycle.

33. The method as recited in claim 29, further comprising:
automatically injecting a substitute cooling medium in the gas turbine generator set in an event of a failure of the cooling fluid compressor, and
isolating the failed cooling fluid compressor using a check valve.

34. The method as recited in claim 29, wherein the cooling fluid compressor includes a first blade having a lower gas bending stress than a second blade of the compressor unit.

35. The method as recited in claim 29, further comprising controlling the cooling fluid compressor so as to keep the thermally loaded part cooled with the cooling fluid at an almost constant metal temperature within a wide load range so as to prevent a shock-like cooling.

36. The method as recited in claim 29, wherein a mass flow of the cooling fluid compressor is greater than a cooling mass flow required for the cooling of the thermally loaded part, and
wherein a portion of the mass flow of the cooling fluid compressor not required for cooling is introduced between the combustion chamber and the turbine.

37. The method as recited in claim 29, further comprising:
operating the combustion chamber near-stoichiometrically using a fuel having a low calorific value.

* * * * *